(12) United States Patent
Ohtsuka

(10) Patent No.: US 7,644,214 B2
(45) Date of Patent: Jan. 5, 2010

(54) INFORMATION PROCESSING APPARATUS AND TASK EXECUTION METHOD

(75) Inventor: Katsushi Ohtsuka, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 7 days.

(21) Appl. No.: 11/431,966

(22) Filed: May 11, 2006

(65) Prior Publication Data

US 2006/0265535 A1 Nov. 23, 2006

(30) Foreign Application Priority Data

May 12, 2005 (JP) .............................. 2005-139665

(51) Int. Cl.
*G06F 13/24* (2006.01)
*G06F 13/32* (2006.01)

(52) U.S. Cl. ........................ 710/260; 710/261; 710/263; 710/266

(58) Field of Classification Search ................ 710/260, 710/261, 263, 266
See application file for complete search history.

(56) References Cited

U.S. PATENT DOCUMENTS

| | | | | |
|---|---|---|---|---|
| 5,179,702 A | * | 1/1993 | Spix et al. .................... | 718/102 |
| 5,283,904 A | * | 2/1994 | Carson et al. ............... | 710/266 |
| 5,671,365 A | | 9/1997 | Binford et al. | |
| 5,701,496 A | * | 12/1997 | Nizar et al. ................. | 710/266 |
| 5,812,811 A | * | 9/1998 | Dubey et al. ................ | 712/216 |
| 6,032,245 A | | 2/2000 | Georgiou et al. | |
| 6,356,969 B1 | | 3/2002 | DeKoning et al. | |

FOREIGN PATENT DOCUMENTS

| | | |
|---|---|---|
| JP | 3210654 A | 9/1991 |
| JP | 3257634 A | 11/1991 |
| JP | 5128078 A | 5/1993 |
| JP | 11265297 | 9/1999 |

OTHER PUBLICATIONS

ISR and Written Opinion, Jul. 17, 2006
Japanese Office Action for corresponding Japanese application JP 2005-139665 dated: Sep. 30, 2008.
Japanese Office Action for corresponding Japanese application JP 2005-139665 dated: Feb. 17, 2009.

* cited by examiner

*Primary Examiner*—Mark Rinehart
*Assistant Examiner*—Jeremy S Cerullo
(74) *Attorney, Agent, or Firm*—Matthew B. Dernier, Esq.; Gibson & Dernier LLP

(57) ABSTRACT

An even-driven interrupt processing is efficiently carried out in a multiprocessor system. A main control unit 112 executes a main process as a processing for controlling an apparatus in a unified manner. A sub-control unit 116 executes a task assigned by the main control unit 112 during the execution of the main process, as a sub-process. An event detector 162 detects an event occurrence upon which an interrupt task is to be preferentially executed during the execution of the main process. An interrupt notification unit 164 notifies the sub-control unit 116 of interrupt information indicative of an interrupt task in response to the detected event. The sub-control unit 116 notified of the interrupt information executes the interrupt task specified by the interrupt information, as a sub-process.

6 Claims, 4 Drawing Sheets

INFORMATION PROCESSING APPARATUS AND TASK EXECUTION METHOD

BACKGROUND OF THE INVENTION

This invention relates to technologies by multiprocessors, and it particularly relates to a technology by which to execute the interrupt processings in a multiprocessor system.

Along with recent years' significant advance of computer graphics technology and image processing technology, which are used in the areas of computer games, digital broadcasting and the like, there is demand for information processing apparatuses, such as computers, game machines and televisions, to have the capacity to process image data of higher definition at higher speed. In order to realize high-performance arithmetic processing in such information processing apparatuses, effective is a method in which a plurality of tasks are processed in parallel, in the information processing apparatus provided with a plurality of processors, by allocating tasks to the respective processors. Since a plurality of processors execute a plurality of tasks in cooperation with one another, it is required that the task be efficiently allotted to each processor in accordance with each processor's status.

Among those tasks, there is a task to be executed in preference to the other tasks when an event occurs. Hereinafter, such a task to be executed, in preference to the other tasks, upon the occurrence of an event will be referred to as an "interrupt task". A processing for executing an interrupt task will be called an "interrupt processing".

When the overhead from the event occurrence until the start of the interrupt task by any of processors becomes large, the real-timeliness of interrupt processing is impaired.

SUMMARY OF THE INVENTION

The present invention has been made to address the foregoing problems and an objective thereof is to provide a technology for suitably executing interrupt processings in a multiprocessor system.

An embodiment according to the present invention relates to an information processing apparatus.

This apparatus comprises a control unit and an interrupt unit.

The control unit includes: a main control unit which executes a main process as a processing for controlling said apparatus in a unified manner; and a sub-control unit which executes a task assigned by the main control unit during the execution of the main process, as a sub-process.

The interrupt unit detects an event occurrence upon which an interrupt task is to be preferentially executed during the execution of the main process, and notifies the control unit of interrupt information indicative of an interrupt task according to the detected event. Then the interrupt unit conveys the interrupt information to the sub-control unit, and the sub-control unit notified of the interrupt information executes the interrupt task specified by the interrupt information, as a sub-process.

The term "task" here means an application programmed to realize a certain purpose or the contents of information processing contained therein and it may correspond to the application or an entity, which is smaller than the application, such as input/output control and commands specified by a user. That is, it may correspond to some sort of processing or function entity.

It is to be noted that those expressing the present invention by a method, an apparatus, a system, a recording medium and a computer program are also effective as the present embodiments.

DETAILED DESCRIPTION OF THE INVENTION

Figure 1:
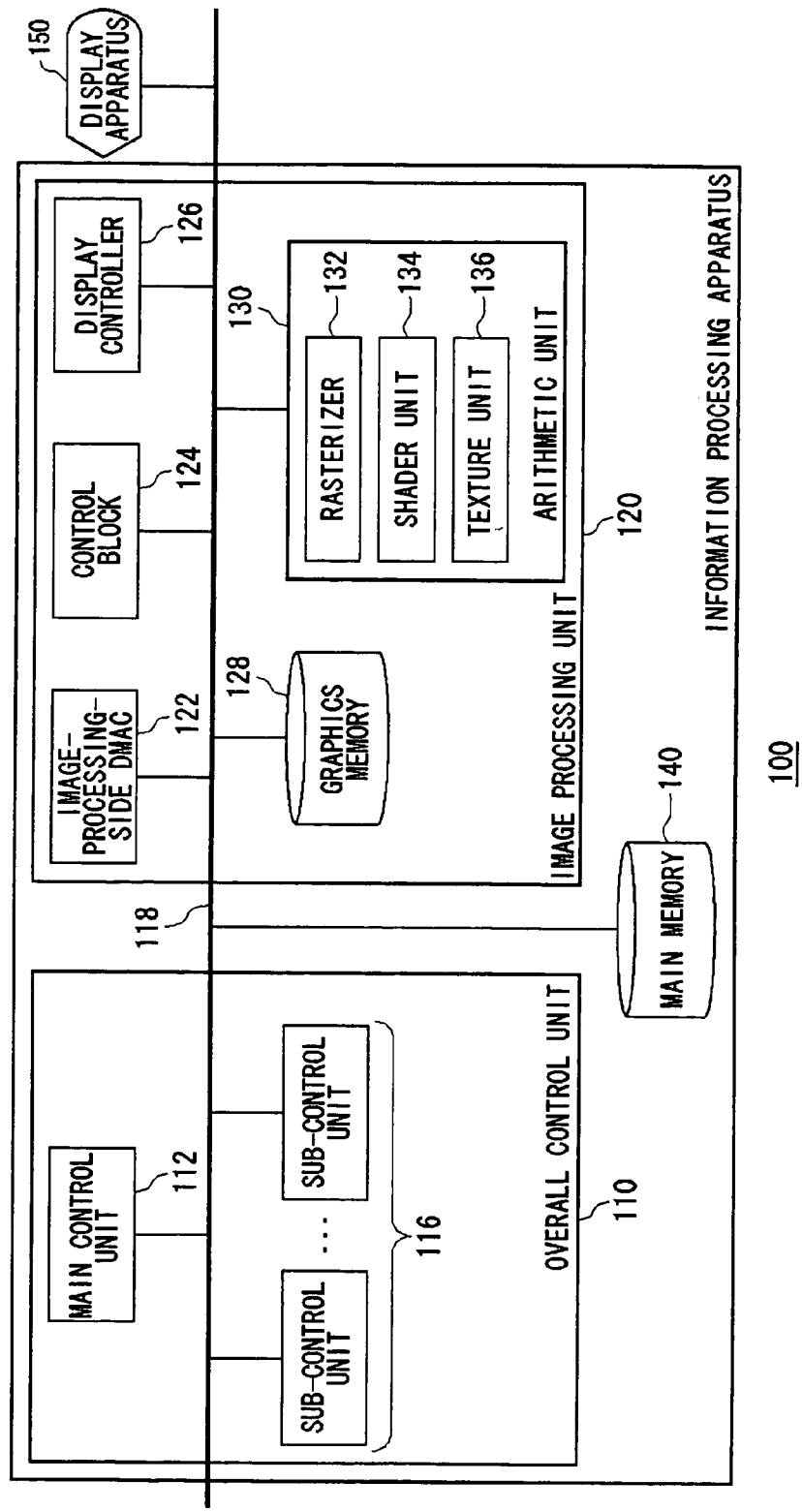
FIG. 1 is a function block diagram of an information processing apparatus.

FIG. 1 is a function block diagram of an information processing apparatus.

An information processing apparatus 100 includes an overall control unit 110, an image processing unit 120 and a main memory 140. The information processing apparatus 100 is connected to a display apparatus 150. The display apparatus 150 outputs the image or video that has been obtained as a result of processing by the overall control unit 110 and the image processing unit 120.

In terms of hardware, each element described, as a function block for carrying out a variety of processings, as shown in FIG. 1 and the like, can be structured by a CPU, a memory and other LSIs. In terms of software, it is realized by memory-loaded programs or the like that have a function of reserved management. Thus, it is understood by those skilled in the art that these function blocks can be realized in a variety of forms such as by hardware only, software only or the combination thereof and are not limited to any of these in particular.

Executed in the information processing apparatus 100 is an operating system (hereinafter referred to simply as "OS (Operation System)") for providing functions and environment for efficient use of the information processing apparatus 100 and controlling the whole apparatus in a unified manner.

The overall control unit 110 includes a main control unit 112 and a plurality of sub-control units 116. The sub-control units 116 and the main control unit 112 can communicate with each other via a bus 118. The main control unit 112 assigns tasks as the basic processing units of each application, to the respective sub-control units 116. Or the main control unit 112 may execute the tasks by itself. With the sub-control units 116 executing their respectively assigned tasks, a plurality of tasks are processed in parallel with one another.

Hereinbelow, the processings executed by the main control unit 112, including the task assignment processing, are called the "main process", and the processings executed by the sub-control units 116 the "sub-process". The main control unit 112 executes processings for overall control of the information processing apparatus 100, such as a user-interface-related processing which has a relatively high priority. In contrast to this, the sub-control units 116 executes processings subcontracted from the main process, such as calculations executed in the background which has a relatively low priority.

A DMAC (Direct Memory Access Controller), not shown, included in the main control unit 112 or the sub-control units 116 controls data transfer, data save and the like with the main memory 140 or the graphics memory 128 by a command from the main control unit 112 or the sub-control unit 116.

The main memory 140 is a storage area used mainly by the overall control unit 110. In the main memory 140, data related to the execution status of a task are stored. For example, modeling data obtained as a result of processing the task concerning computer graphics by the overall control unit 110 are stored temporarily. There are also cases where data generated by the image processing unit 120 are saved in this main memory 140.

The image processing unit 120 is a unit that exclusively executes image processing, for instance, rendering processing. The image processing unit 120 executes image processing, following the instructions from the overall control unit 110. The image processing unit 120 carries out image processing related to the respective tasks processed by the overall control unit 110 and outputs the generated images or videos to the display apparatus 150. The image processing unit 120 may time-share and execute a plurality of image processings parallelly.

The image processing unit 120 includes a graphics memory 128, an arithmetic unit 130, a display controller 126, a control block 124 and an image-processing-side DMAC 122. These units are connected with one another via the bus 118 and thus the units can communicate with one another.

The graphics memory 128 is a memory area for storing graphics data that are used and managed by the image processing unit 120. Provided in the graphics memory 128 are not only a frame buffer and a Z-buffer, where image frame data are stored, but also areas corresponding to data, such as vertex data, texture data and color lookup table, which are the basic data referred to at the rendering of image frame data.

The control block 124 is a block for controlling the image processing unit 120 as a whole. The control block 124 performs an overall control of the arithmetic unit 130, the graphics memory 128 and the display controller 126 and carries out synchronization management, timer management and the like of data transfer between the respective blocks.

The image-processing-side DMAC 122 controls the data transfer, data save and the like between the overall control unit 110 or the main memory 140 and the graphics memory 128, following a command from the control block 124.

The display controller 126 generates horizontal and vertical synchronization signals and loads, sequentially in a line, the pixel data of image frame data from a frame buffer stored in the graphics memory 128 according to the display timing of the display apparatus 150. Furthermore, the display controller 126 makes an output by converting the pixel data having been loaded in a line, from the digital data comprised of RGB color values, into a format corresponding to the display apparatus 150.

The arithmetic unit 130 carries out a variety of arithmetic processings concerning graphics, following the commands from the control block 124. One example of such processing may be a series of rendering processings of generating image frame data through coordinate transformation, hidden-surface elimination and shading based on three-dimensional modeling data and writing them into a frame buffer.

The arithmetic unit 130 includes such function blocks as a rasterizer 132, a shader unit 134 and a texture unit 136 in order to effect a high-speed processing of three-dimensional graphics in particular.

The rasterizer 132 receives vertex data of a basic object to be rendered (hereinafter referred to as "primitive") from the overall control unit 110 and performs a view transformation of converting the primitive on a three-dimensional space into graphics on a rendering plane through a projection transformation. Furthermore, it carries out a raster processing of scanning the graphics on the rendering plane along the horizontal direction of the rendering plane and converting them column by column into quantized pixels. The primitive is pixel-expanded by the rasterizer 132, and the pixel information is calculated for each pixel. This pixel information includes RGB color values, a values indicating transparency, and Z values indicating depth from viewpoints.

The rasterizer 132 generates a pixel area of a predetermined size along the scan lines and outputs it to the shader unit 134 and the texture unit 136. The pixel areas outputted from the rasterizer 132 are once stacked into a queue, and the shader unit 134 processes the stacked pixel areas one by one.

The shader unit 134 carries out a shading processing based on the pixel information calculated by the rasterizer 132, determines the pixel colors after a texture mapping based on the texel information obtained by the texture unit 136, and writes the image frame data after the shading processing in a frame buffer in the graphics memory 128. Furthermore, the shader unit 134 performs processings, such as fogging and alpha blending, on the image frame data written into the frame buffer, determines final rendering colors, and updates the image frame data in the frame buffer.

The texture unit 136 receives parameters specifying texture data from the shader unit 134, reads out the requested texture data from a texture buffer in the graphics memory 128, and outputs them to the shader unit 134 after performing a predetermined processing thereon.

Upon receipt of basic information necessary for image generation, such as the vertex data of a primitive, or a start instruction for image generation from the overall control unit 110, the image processing unit 120 executes image processing independently of the overall control unit 110. When the instructed image processing is completed, the image processing unit 120 informs the overall control unit accordingly as an event. When the event is informed from the image processing unit 120, the overall control unit 110 executes an interrupt task by an event handler that corresponds to said event. In a case of the interrupt task to be executed on the condition that the image processing unit 120 has generated a predetermined image, the overall control unit 110 executes the interrupt task upon being informed of an event indicating that the image generation has been completed.

Suppose, for instance, that a certain sub-control unit 116 in the overall control unit 110 instructs the image processing unit 120 to generate images in accordance with a predetermined window in the display apparatus 150 and another sub-control unit 116 instructs it to generate images in accordance with another window in the display apparatus 150. Then, the image processing unit 120 carries out processes, in parallel, for the respective images by a plurality of threads.

If the overall control unit 110 intends to clip the image of a portion in which the two windows overlap, the overall control unit 110 executes clipping processing as an interrupt task when notified of an event indicating that the generation of these two windows has been completed. After it instructed the image processing unit 120 to execute image processing, the overall control unit 110 executes another task. And when notified of the event, the interrupt task is preferentially executed by an event handler. In this manner, the overall control unit 110 and the image processing unit 120 operate in coordination in an asynchronous manner.

The sub-control unit 116 may transfer to the image processing unit 120 the data generated at the time of executing a task and then, based on the data, the image processing unit 120 may take over the execution of a task from the sub-control unit 116. For example, the image processing unit 120 may display the graphics, based on a result of coordinates calculated by the sub-control unit 116. Thereby, the graphics-related calculation such as the coordinate calculation, texture attaching and shading can be shared and executed between the sub-control unit 116 and the image processing unit 120. That is, in the mode of executing such a task, the task assigned to the sub-control unit 116 will be executed by the collaboration between the sub-control unit 116 and the image processing unit 120.

Figure 2:
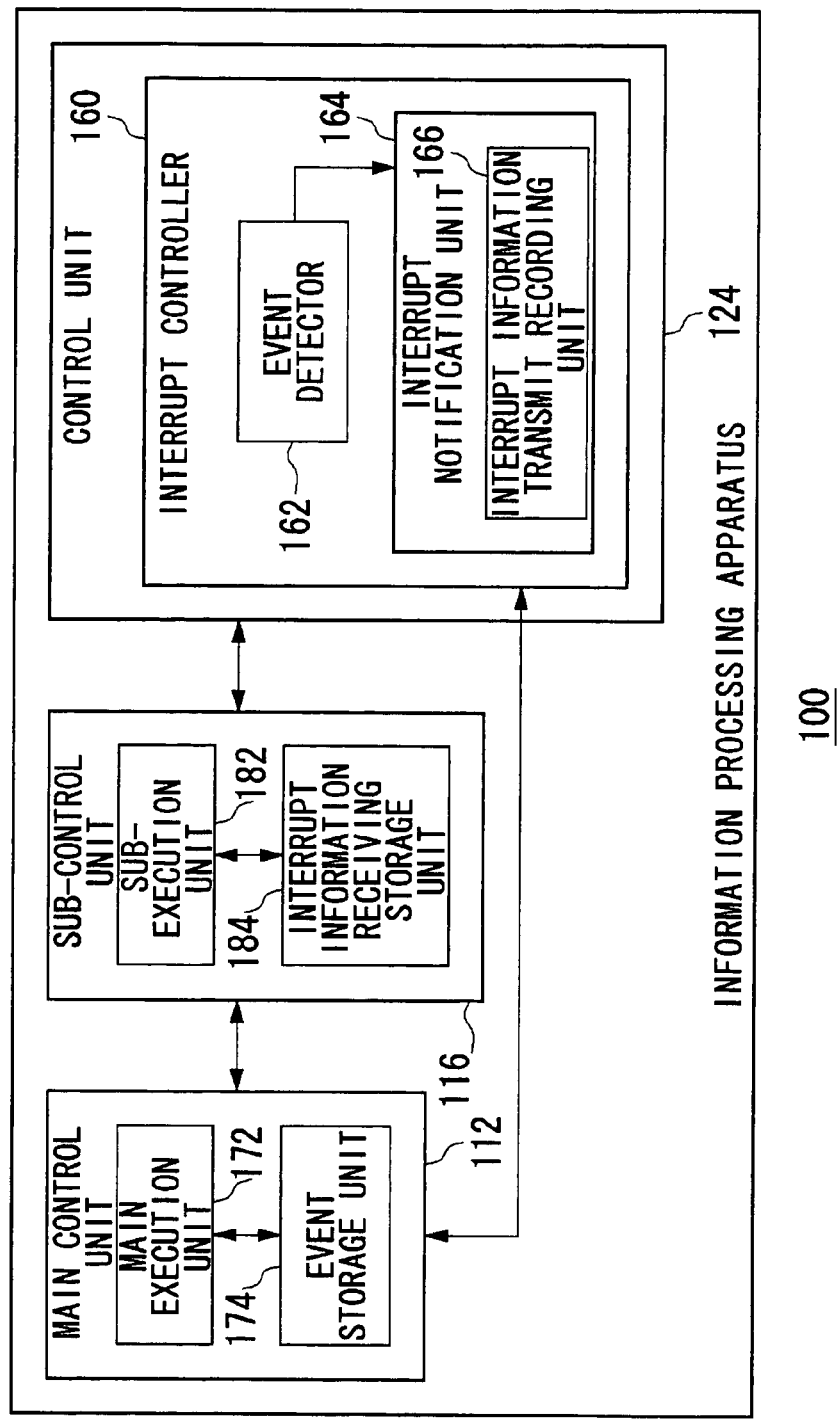
FIG. 2 is a block diagram relative to an interrupt processing in an image processing unit and an overall control unit.

FIG. 2 is a block diagram related to an interrupt processing in the image processing unit and the overall control unit.

All sorts of events that have occurred in the image processing unit 120 are conveyed to the overall control unit 110 through an interrupt controller 160 in a control block 124. Then the main control unit 112 or sub-control unit 116 in the overall control unit 110 executes an interrupt task in response to the notified event.

First Interrupt Processing Method:

A processing process conceivable as a general interrupt processing (hereinafter referred to as "first interrupt processing method") is as follows. Firstly, an event detector 162 in the interrupt controller 160 detects the occurrence of an event. Then an interrupt notification unit 164 conveys the occurrence of an event to an event storage unit 174 as event information. The event information is conveyed through packet communications. The event information is information with which to inform the timing of event occurrence and it does not contain information for specifying an interrupt task in response to an event. Instead, the interrupt notification unit 164 records the information for specifying an interrupt task in response to an event (hereinafter this information will be referred to as "interrupt information") in an interrupt information transmit storage unit 166. The interrupt information contains the types of events, the types of interrupt tasks to be executed according to an event, and parameters on which the interrupt tasks are to be based.

The main control unit 112 records the notified event information in the event storage unit 174. The event storage unit 174 can store a plurality of events. An event handler executed by the main execution unit 172 in the main control unit 112 takes out the event information from the event storage unit 174 in the manner of FIFO (First-In First-Out). The main execution unit 172 in the main control unit 112 reads out the interrupt information from the interrupt information transmit storage unit 166 in the control block 124, so as to identify an interrupt tasks to be executed.

Normally, the tasks are fixedly allocated to the sub-control units 116. Such a sub-control unit 116 as this is in the state of, for example, having been reserved from a program start-up, and processes the tasks, such as a predetermined coordinate calculation, which are to be executed steadily. On the other hand, there may be a case where the main execution unit 172 in the main control unit 112 selects a sub-control unit 116 which is in a state capable of executing the interrupt task from among the unreserved sub-control units 116, and instructs the execution of the interrupt task. It is to be noted that the main execution unit 172 itself in the main control unit 112 may execute the interrupt task. A thread executed in the sub-control unit 116 which is assigned a task from the main control unit 112 is normally in a standby state. With a task assigning instruction, the threads executed by these unreserved sub-control units 116 shift from a standby state to an execution state. At this time, the sub-control unit 116 is also given the information for executing the task, from the main control unit 112. When the sub-control unit 116 has completed the execution of the task, it shifts back to a standby state again and notifies the main control unit 112 that it has shifted back accordingly. As a result, the main control unit 112 can determine which sub-control unit 116 is in a standby state, namely, a state in which a task is executable instantaneously, among a plurality of sub-control units 116.

At the time of instructing the execution of an interrupt task, the main control unit 112 hands the interrupt information over to the sub-control unit 116. A sub-execution unit 182 in the sub-control unit 116 executes an interrupt task specified by the interrupt information.

In the first interrupt processing method, the main control unit 112 is more or less involved in all of the interrupt processes. The interrupt task must be executed in preference to the other tasks. Hence, when the event information is to be detected, the main control unit 112 needs to carry out the above-described assignment processing in a top-priority manner. As a result, if the occurrence of events takes places continuously within a short period of time, the processing load of the main control unit 112 may be overloaded and therefore the processing of a main process may be disrupted.

The event information sent from the interrupt notification unit 164 is getting stacked in the event storage unit 174. If the event storage unit 174 overflows as a result of disruption of processing in the main control unit 112 at the time the interrupt notification unit 164 informed the event information, the interrupt notification unit 164 is required to resend the event information. In such a case, the real-timeliness of interrupt processing will be impaired.

Second Interrupt Processing Method:

In contrast to the above, a method according to an embodiment will now be described in which the sub-control unit 116 executes the interrupt tasks without going through the interrupt processing by the main control unit 112. A process of such interrupt processing (hereinafter referred to as "second interrupt processing method") is as follows.

When the event detector 162 detects an event, the interrupt notification unit 164 writes the interrupt information (not the event information) to an interrupt information receiving storage unit 184 in the sub-control unit 116. The processing of a direct writing to the interrupt information receiving storage unit 184 is preferred instead of the packet communications done when the event information was transmitted.

At the time of writing the interrupt information, the interrupt notification unit 164 selects a sub-control unit 116, which is to execute the interrupt task, from among sub-control units 116 whose threads are in a standby state in a plurality of sub-control units 116. In the second interrupt processing method, when the thread of the sub-control unit 116 has completed the execution of a task and then shifts to a standby state, the sub-control unit notifies the image processing unit 120 accordingly. With this notification, the interrupt notification unit 164 can determine a sub-control unit 116 whose thread is in a standby state and is capable of executing an interrupt task instantaneously. The event handler which is being executed in the sub-execution unit 182 in the sub-control unit 116 reads out the interrupt information from the interrupt information receiving storage unit 184 and a specified interrupt task is executed.

According to the second interrupt processing method, the interrupt notification unit 164 can directly inform the sub-control unit 116, by which an interrupt task is to be executed, of the interrupt information without going through the main control unit 112. As a result thereof, the overhead in the interrupt processing can be reduced as a whole, compared with the first interrupt method.

It is to be noted that the main control unit 112 may fixedly assign tasks to the sub-control unit 116. The sub-control unit 116 may execute the tasks, as a sub-process, in cooperation with the image processing unit 120. In such a case, firstly the main control unit 112 assigns a task to the sub-control unit 116 and next the sub-control unit 116 reads out data necessary for executing the task, from the main memory 140. The sub-control unit 116 stores the data read out from the main memory 140, in a local memory built inside the sub-control unit 116. For example, when executing the coordinate calculation as a task, the sub-control unit 116 reads out table data indicative of coordinate information, from the main memory 140.

Based on the data stored in this local memory, the sub-control unit 116 executes the task assigned by the main control unit 112. The sub-control unit 112 stores the data generated by execution of the task, in a local memory and at the same time it transfers the data generated by execution of the task to the graphics memory 128 by a built-in DMAC. Based on the data read out from the graphics memory 128, the image processing unit 120 executes the processing further. For example, it executes rendering processing based on the result data of the coordinate calculation transferred from the sub-control unit 116. The control block 124 conveys the execution result, as interrupt information, to the sub-control unit 116 which is the source of data transmission. In this manner, the task assigned to the sub-control unit 116 may be executed in cooperation with the sub-control unit 116 and the image processing unit 120.

In this case, the data can be transferred from the sub-control unit 116 to the image processing unit 120 by DMA transfer, without through the main control unit 112, at the time of executing a task as a sub-process. Hence, the sub-control unit 116 and the image processing unit 120 can execute a task as a sub-process in closer liaison with each other. In particular, this method is effective, for example, when three-dimensional graphics processing with large processing loads is carried out by the sub-control unit 116 and the image processing unit 120 in liaison with each other.

Next, the processing processes for the first interrupt processing method and second interrupt processing method will be explained using sequence diagrams.

Figure 3:
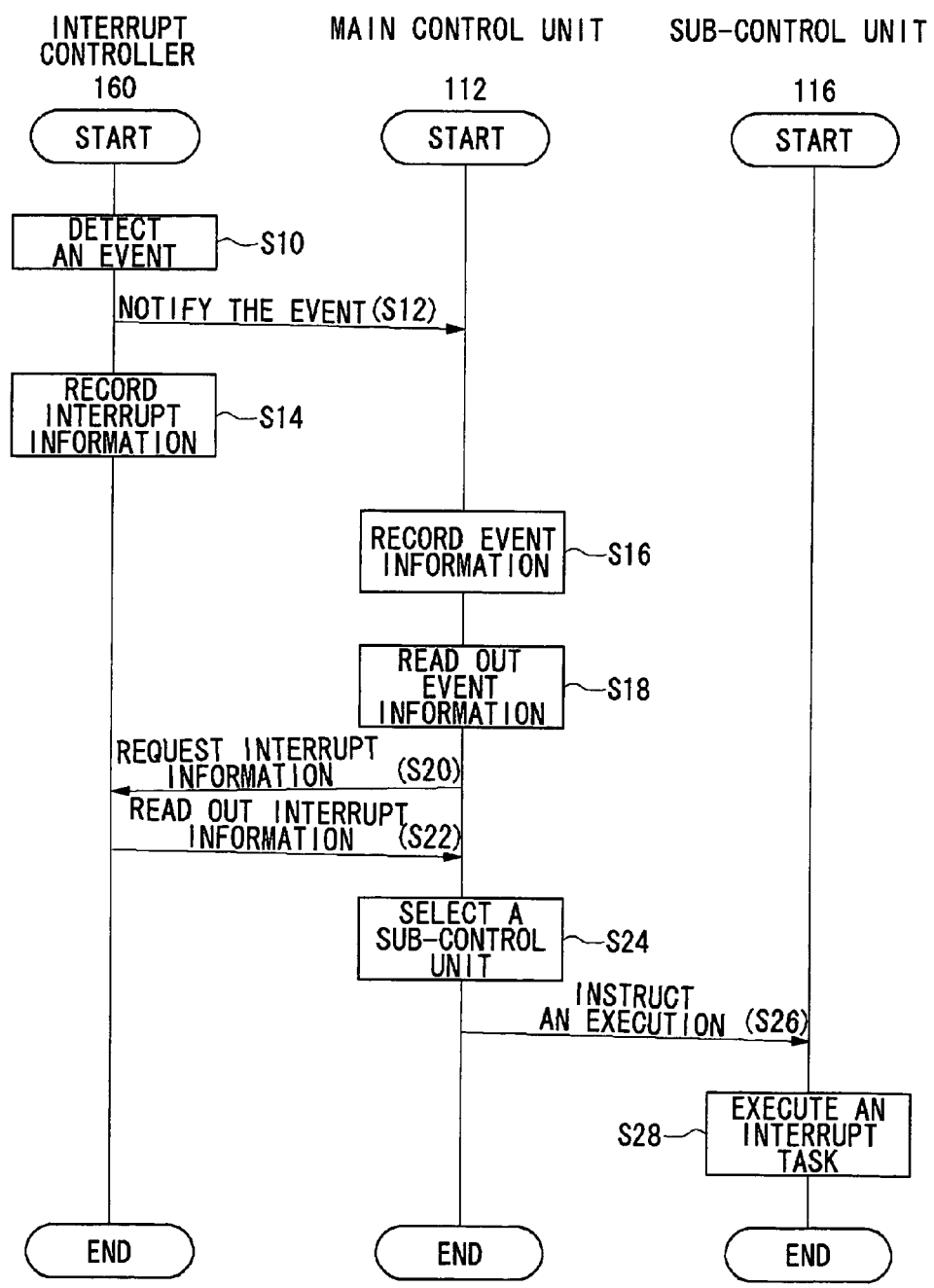
FIG. 3 is a flowchart showing a process of interrupt processing in the first interrupt processing method.

FIG. 3 is a flowchart showing a process of interrupt processing in the first interrupt processing method.

Firstly, detecting an event by the event detector 162 starts an interrupt processing (S10). The interrupt notification unit 164 conveys the detection of an event to the main control unit 112 as event information through packet communications (S12).

The interrupt information transmit storage unit 166 stores temporarily the interrupt information in response to the event detected (S14). The event storage unit 174 in the main control unit 112 stores the event information informed in S12. This event information is read out by the main execution unit 172 in the manner of FIFO (S18). When the main execution unit 172 reads out the event information, it requests the readout of interrupt information from the interrupt information transmit storage unit 166 (S20). The main execution unit 172 reads out the interrupt information from the interrupt information transmit storage unit 166 (S22).

The main execution unit 172 selects a sub-control unit 116 which is to execute the interrupt task specified by the interrupt information (S24). The main control unit 112 hands the interrupt information read out in S22 over to the sub-control unit 116 selected in S24 so as to instruct the execution of interrupt task (S26). The sub-control unit 116 instructed to execute it executes the interrupt task specified by the interrupt information (S28). When the execution of a task has been completed, the sub-control unit 116 notifies the main control unit 112 accordingly. This notification enables the management of whether the sub-control unit 116 is in a standby state or execution state.

Figure 4:
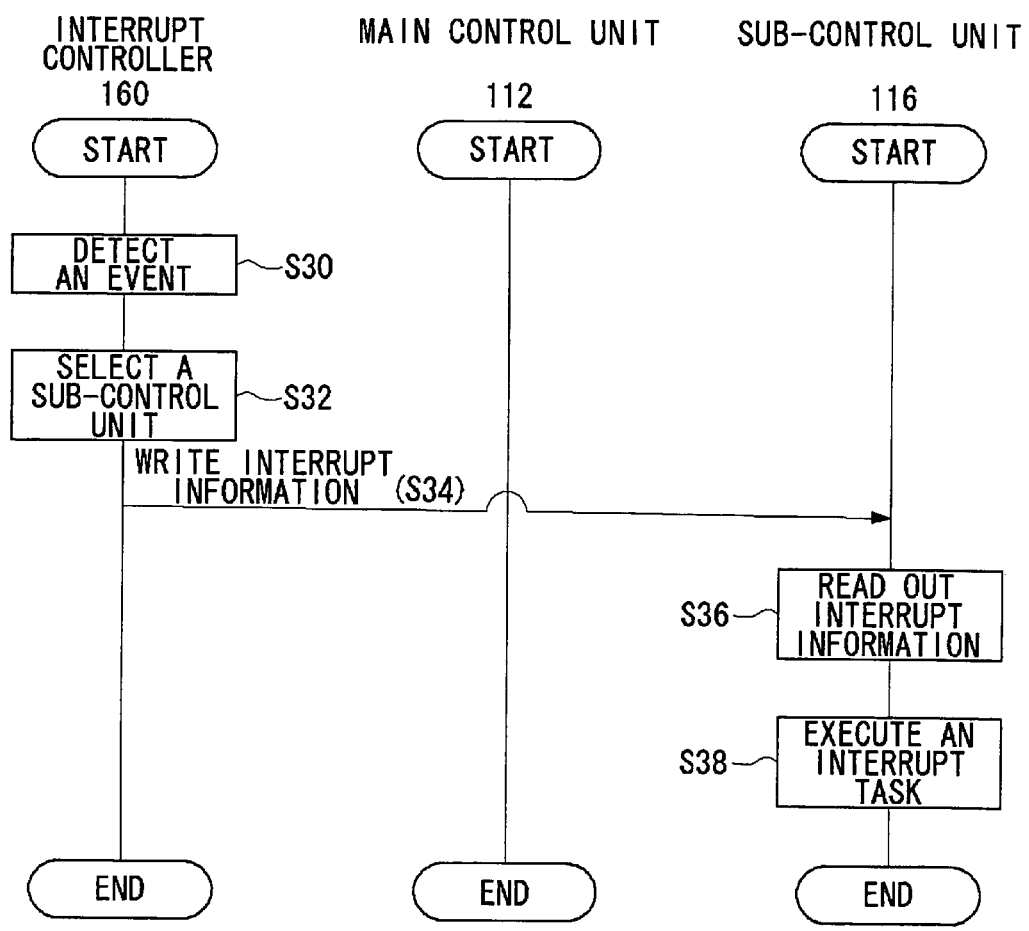
FIG. 4 is a flowchart showing a process of interrupt processing in the second interrupt processing method.

FIG. 4 is a flowchart showing a process of interrupt processing by the second interrupt processing method.

Firstly, when the event detector 162 detects the occurrence of an event (S30), the interrupt notification unit 164 selects a sub-control unit 116 which is in a state capable of executing an interrupt task, among a plurality of sub-control units 116 (S32).

The interrupt notification unit 164 writes the interrupt information to the interrupt information receiving storage unit 184 of the selected sub-control unit 116 (S34). Then the interrupt notification unit 164 writes the interrupt information which may contain job IDs for identifying applications and device IDs for identifying a sub-control unit 116. Thus, the sub-control unit 116 to which the interrupt information has been written can also determine whether the interrupt information is being normally conveyed or not, by referring to the job IDs or device IDs.

The sub-control unit 116 reads out the written interrupt information (S36) and executes the interrupt task specified by the interrupt information (S38).

In the case of the first interrupt processing method, the interrupt controller 160 sends all events to the main control unit 112, so that there is a merit in that the processing in the interrupt controller 160 side can be simplified. On the other hand, since all the interrupt processings are carried out through the main control unit 112, the processing by the main control unit 112 may form a bottleneck in the interrupt processing.

In contrast thereto, in the case of the second interrupt processing method, the interrupt controller 160 in the image processing unit 120 needs to control the state of a sub-control unit 116 in the overall control unit 110. However, there is a merit in that the overhead in the interrupt processing can be reduced as compared with the first interrupt processing method.

Normally, various kinds of events are informed to the main control unit 112 from peripheral equipment other than the image processing unit 120 via an I/O bridge (not shown). As a more suitable mode of carrying out the present invention, it is desirable that each event be basically processed by the first interrupt processing method whereas events belonging to a predefined event group be processed by the second interrupt processing method. This event group may be such that a programmer of application software may define it as a group to which events executed by the sub-control unit 116 (not by the main control unit 112) belong to and events required to have more real-timeliness or events which are particularly likely to occur most frequently belong to.

If the first interrupt method and the second interrupt method are used in parallel with each other, the cost related to the development can be kept low and the overhead in the interrupt processing and eventually in the processing of the information processing apparatus 100 can be reduced.

The present invention has been described based on the embodiments. These embodiments are merely exemplary, and it is understood by those skilled in the art that various modifications to the combination of each component and process thereof are possible and that such modifications are also within the scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus, comprising:
an overall control unit including:

a main control unit which executes a main process for controlling said apparatus in a unified manner; and a plurality of sub-control units, including at least one sub-control unit which executes a task assigned by the main control unit during the execution of the main process, as a sub-process; and an interrupt unit including:

an event detector which detects an event occurrence upon which an interrupt task is executed during the execution of the main process; and an interrupt notification unit which notifies said overall control unit of interrupt information indicative of the interrupt task according to the detected event, wherein the interrupt notification unit selects the sub-control unit, which is in a state capable of executing the interrupt task, from among the plurality of sub-control units, and notifies the selected sub-control unit of the interrupt information, wherein the sub-control unit notified of the interrupt information executes the interrupt task specified by the interrupt information, as a sub-process, and wherein interrupt processing in the information processing apparatus, from the event detection through completion of the execution of the specified interrupt task by the sub-control unit, occurs without activity by the main control unit in connection with the interrupt processing.

2. An information processing apparatus according to claim 1, wherein the sub-control unit includes an interrupt information receiving storage unit for temporarily storing said interrupt information, wherein the interrupt notification unit informs the sub-control unit of said interrupt information in a manner such that the interrupt information is recorded in the interrupt information receiving storage unit in a sub-control unit which is a notifying party, and wherein the sub-control unit reads out the interrupt information recorded in the interrupt information receiving storage unit and executes said interrupt task specified by said interrupt information, as a sub-process.

3. An information processing apparatus according to claim 1, further comprising an auxiliary unit which executes a task instructed from said control unit, wherein the sub-control unit transfers data generated as a result of execution of the assigned task to said auxiliary unit and, based on the transferred data, said auxiliary unit executes a task which forms a sequel to the task executed by the sub-control unit, and thereby the sub-control unit and said auxiliary unit collaborate together to execute a task as a sub-process.

4. An information processing apparatus according to claim 3, wherein the sub-control unit transfers the generated data to said auxiliary unit by DMA (Direct Memory Access) transfer.

5. A method for executing tasks in an information processing apparatus including a main control unit which executes a main process for controlling said apparatus in a unified manner, a plurality of sub-control units, including at least one sub-control unit which executes a task assigned by the main control unit during the execution of the main process, as a sub-process, and an interrupt notification unit which notifies said information processing apparatus of interrupt information indicative of an interrupt task, the method comprising:

detecting an event occurrence upon which the interrupt task is executed during the execution of the main process;

having the interrupt notification unit select the sub-control unit, which is in a state capable of executing the interrupt task, and notify the sub-control unit of the interrupt information indicative of the interrupt task according to the detected event;

having the sub-control unit notified of the interrupt information execute the interrupt task specified by the interrupt information, as a sub-process, and conducting interrupt processing in the information processing apparatus, from the event detection through completion of the execution of the specified interrupt task by the sub-control unit, without the main control unit undertaking any activity in connection with the interrupt processing.

6. A recording medium, readable by a computer, which stores a task execution program, executable by a computer, for executing tasks in an information processing apparatus including a main control unit which executes a main process for controlling said apparatus in a unified manner, a plurality of sub-control units, including at least one sub-control unit which executes a task assigned by the main control unit during the execution of the main process, as a sub-process, and an interrupt notification unit which notifies said information processing apparatus of interrupt information indicative of an interrupt task, the program including the functions of:

detecting an event occurrence upon which the interrupt task is executed during the execution of the main process;

having the interrupt notification unit select the sub-control unit, which is in a state capable of executing the interrupt task, and notify the sub-control unit of the interrupt information indicative of the interrupt task according to the detected event;

having the sub-control unit notified of the interrupt information execute the interrupt task specified by the interrupt information, as a sub-process, and conducting interrupt processing in the information processing apparatus, from the event detection through completion of the execution of the specified interrupt task by the sub-control unit, without the main control unit undertaking any activity in connection with the interrupt processing.

* * * * *